US009788035B2

(12) United States Patent
McNamee et al.

(10) Patent No.: US 9,788,035 B2
(45) Date of Patent: *Oct. 10, 2017

(54) SYSTEMS AND METHODS FOR COMMUNICATING EVENTS TO USERS

(71) Applicant: Roger B. and Ann K. McNamee Trust, Woodside, CA (US)

(72) Inventors: Roger McNamee, Menlo Park, CA (US); Glenn Evans, Menlo Park, CA (US); Mark Richards Frederick, Sandy, UT (US)

(73) Assignee: THE ROGER B. AND ANN K. MCNAMEE TRUST U/T/A/D, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,378

(22) Filed: Nov. 24, 2015

(65) Prior Publication Data

US 2016/0080791 A1    Mar. 17, 2016

Related U.S. Application Data

(63) Continuation of application No. 14/078,298, filed on Nov. 12, 2013, now Pat. No. 9,226,038.
(Continued)

(51) Int. Cl.
*H04N 7/20* (2006.01)
*H04N 21/2662* (2011.01)
(Continued)

(52) U.S. Cl.
CPC ..... *H04N 21/2662* (2013.01); *H04N 21/2187* (2013.01); *H04N 21/233* (2013.01);
(Continued)

(58) Field of Classification Search
CPC .......... H04N 21/2662; H04N 21/6193; H04N 21/233; H04N 21/2187; H04N 21/643; H04N 21/2368; H04N 21/6175
(Continued)

(56) References Cited

U.S. PATENT DOCUMENTS 4,551,740 A    11/1985   Hung
4,604,458 A     8/1986   Hung
(Continued)

FOREIGN PATENT DOCUMENTS

DE    196 40 758    4/1998
GB    2083488       3/1982
(Continued)

OTHER PUBLICATIONS

International Search Report and Written Opinion for PCT/US2014/022841, filed Mar. 10, 2014, dated Jun. 26, 2014—058518-5001-WO.
(Continued)

*Primary Examiner* — Nnenna Ekpo
(74) *Attorney, Agent, or Firm* — Morgan, Lewis & Bockius LLP; Brett A. Lovejoy

(57) ABSTRACT

Systems and methods for distributing an audio/visual feed of events include mixing audio signals, from microphones monitoring the event, with sound board feed from the event public address system, thereby forming a mixed audio signal. A video input signal is received at each video input in one or more video inputs at a video board from one or more corresponding cameras recording the event. A video input signal is selected as the video board output and is combined with the mixed audio signal thereby producing an audio/visual signal. This signal is encoded using a video codec, at each of several bitrates, and an audio codec, thereby forming bitrate streams each comprising the video
(Continued)

portion of the audio/visual signal at a unique bitrate. The streams are received by a satellite router and transmitted to a satellite which sends them to one or more downlink servers for Internet distribution.

24 Claims, 5 Drawing Sheets

Related U.S. Application Data

(60) Provisional application No. 61/725,421, filed on Nov. 12, 2012.

(51) Int. Cl.
| | |
|---|---|
| H04N 21/61 | (2011.01) |
| H04N 21/2368 | (2011.01) |
| H04N 21/2187 | (2011.01) |
| H04N 21/233 | (2011.01) |
| H04N 21/643 | (2011.01) |

(52) U.S. Cl.
CPC ..... *H04N 21/2368* (2013.01); *H04N 21/6175* (2013.01); *H04N 21/6193* (2013.01); *H04N 21/643* (2013.01)

(58) Field of Classification Search
USPC .......... 725/63, 67, 68, 70, 114, 144; 348/47, 348/159, 575, 723
See application file for complete search history.

(56) References Cited

U.S. PATENT DOCUMENTS

| | | | | |
|---|---|---|---|---|
| 5,477,270 | A * | 12/1995 | Park | H04N 5/232 348/222.1 |
| 5,729,471 | A * | 3/1998 | Jain | H04N 5/222 345/419 |
| 6,723,893 | B1 | 4/2004 | Brown et al. | |
| 6,765,088 | B1 | 7/2004 | Korth et al. | |
| 6,952,221 | B1 * | 10/2005 | Holtz | G11B 27/034 715/719 |
| 7,079,176 | B1 * | 7/2006 | Freeman | G03C 1/26 348/207.1 |
| 7,407,948 | B2 | 8/2008 | Griffiths et al. | |
| 7,653,924 | B1 | 1/2010 | Deng et al. | |
| 8,136,133 | B2 * | 3/2012 | Walker | G11B 27/034 348/575 |
| 8,379,874 | B1 * | 2/2013 | Simon | H04R 27/00 381/1 |
| 2002/0046405 | A1 * | 4/2002 | Lahr | H04L 29/06027 725/87 |
| 2003/0022243 | A1 | 1/2003 | Kondejewski et al. | |
| 2003/0104577 | A1 | 6/2003 | Lingappa et al. | |
| 2003/0158204 | A1 | 8/2003 | Galey et al. | |
| 2003/0162246 | A1 | 8/2003 | Endo et al. | |
| 2003/0204850 | A1 | 10/2003 | Ng et al. | |
| 2004/0078825 | A1 | 4/2004 | Murphy | |
| 2006/0177813 | A1 | 8/2006 | Endo | |
| 2006/0264423 | A1 | 11/2006 | Wood et al. | |
| 2006/0277576 | A1 | 12/2006 | Acharya et al. | |
| 2007/0044133 | A1 | 2/2007 | Hodecker | |
| 2007/0128633 | A1 | 6/2007 | Zozulya et al. | |
| 2007/0204300 | A1 | 8/2007 | Markley et al. | |
| 2007/0288978 | A1 | 12/2007 | Pizzurro et al. | |
| 2008/0115181 | A1 | 5/2008 | Ryckman et al. | |
| 2008/0307948 | A1 | 12/2008 | Minarik | |
| 2009/0189981 | A1 | 7/2009 | Siann et al. | |
| 2009/0238263 | A1 | 9/2009 | Jaggi et al. | |
| 2009/0262137 | A1 * | 10/2009 | Walker | H04H 60/04 345/629 |
| 2009/0290024 | A1 * | 11/2009 | Larson | H04N 1/00132 348/159 |
| 2009/0313659 | A1 * | 12/2009 | Samuels | G08B 13/19656 725/78 |
| 2010/0204215 | A1 | 8/2010 | Galey et al. | |
| 2010/0271951 | A1 | 10/2010 | Dujardin et al. | |
| 2012/0320196 | A1 | 12/2012 | Overton et al. | |
| 2013/0194495 | A1 | 8/2013 | Pan | |
| 2014/0038515 | A1 | 2/2014 | Avellan et al. | |
| 2014/0139386 | A1 | 5/2014 | Liu et al. | |
| 2014/0282748 | A1 | 9/2014 | McNamee et al. | |
| 2015/0015674 | A1 * | 1/2015 | Weinstock | H04N 13/0296 348/48 |

FOREIGN PATENT DOCUMENTS

| | | |
|---|---|---|
| KR | 10-2003-0031992 | 4/2003 |
| WO | WO 02/096896 | 12/2002 |
| WO | WO 2004/033628 | 4/2004 |
| WO | WO 2005 019828 | 3/2005 |
| WO | WO 2005/054217 | 6/2005 |
| WO | WO 2006/032847 | 3/2006 |
| WO | WO 2006/032879 | 3/2006 |

OTHER PUBLICATIONS

International Search Report and Written Opinion for PCT/US2013/069721, filed Nov. 12, 2013, dated May 12, 2014—058518-5005-WO.

* cited by examiner

SYSTEMS AND METHODS FOR COMMUNICATING EVENTS TO USERS

CROSS REFERENCE TO RELATED APPLICATIONS

This application claims priority to U.S. Provisional Patent Application No. 61/725,421, filed Nov. 12, 2012, entitled "Systems and Methods for Communicating a Live Event to Users Using the Internet."

This application also claims priority to U.S. patent application Ser. No. 14/078,298, filed Nov. 12, 2013, entitled "Systems and Methods for Communicating a Live Event to Users Using the Internet."

TECHNICAL FIELD

The disclosed embodiments relate generally to systems and methods for distributing an audio/visual feed of a live event.

BACKGROUND

A central goal of the organizers and producers of a live event, such as a concert, is to get the content of the live event distributed to a wide audience. Aside from assuring sufficient financial compensation to make the live event commercially feasible, the most fundamental measure of the success of the live event is how many people participated in, viewed, or listened to the live event. In this vein, a live event heard or viewed by 10,000 or 100,000 people is generally considered more successful than one that is heard or viewed by one hundred or fewer people.

Ever since the advent of radio and later television, live event broadcasting has extended the audience of live events beyond those who are physically present at the live event. While radio and television broadcasting has proven adequate in many instances, they also have drawbacks. Radio lacks the visual aspect, and thus fails to draw participants into the live event in the manner that television can. Television, on the other hand, while visually compelling, is expensive for both the organizers and producers of the live event, who must pay royalty fees, access fees, or other types of fees to television broadcasters, and the viewers, who typically must pay subscription fees for anything beyond the most limited set of television signals that are broadcasted without scrambling. Television broadcasting is further disadvantaged by the expense and bulk of the equipment that must be used at the live event to actually broadcast the signal.

The advent of the Internet has led to a third possible way of distributing live events. There are now a huge range of Internet connected devices available which are capable of high quality video playback. These include laptops and home media centers, smartphones such as the APPLE iPHONE, Blueray devices and gaming consoles. These devices are typically connected to un-managed access networks such as 3G, home networks and WiFi hot spots. In accordance with the Internet distribution approach, cameras and microphones can be used to record the live event. These video and audio signals can then be encoded by any of a number of codecs and distributed on the Internet. While this approach in theory is attractive, a number of drawbacks are inherent to this approach. First, this approach assumes that there is a distribution server hard wired to the live event venue. This is typically not the case. In typical instances, the most that organizers and producers of a live event can rely upon at the live event venue is a stable source of power and light. Thus, if distribution of the live event over the Internet is desired, a satellite uplink is required. The cost for such a satellite uplink is decreasing on a daily basis and thus this drawback to Internet access is dissipating. However, a much more significant drawback with Internet distribution is beginning to unfold as users migrate from use of desktops, which are hardwired to the Internet, to portable devices that communicate with the Internet using wireless communication protocols at constantly varying signal strengths. Because of these constantly varying signal strengths, conventional Internet broadcasts of live events will typically be unsatisfactory. If a high resolution bitrate is selected for encoding the live event, users having low signal strength will incur unreasonable pauses as they wait for the live event to stream onto their mobile device. If a low resolution bitrate is selected for encoding the live event, users, regardless of their signal strength quality, will at best view a grainy low resolution video feed of the live event, with tinny or otherwise inadequate sound. Moreover, consider the case in which a user is traveling and thus, at some points in time has a high bandwidth connection, whereas at other times has a low bandwidth connection. In such instance, neither the low nor the high resolution bitrate is suitable all the time. At least some of the time the resolution of the video feed will not be suboptimal or will take too long to download, leading to pauses and destroying any appreciation for the live event.

Given the above background, what is needed in the art are systems and methods for distributing high quality video and audio feed of live events over the Internet in a cost effective manner using portable equipment that relies solely on the resources that can be expected at a live event venue.

SUMMARY

The present disclosure addresses the drawbacks for distributing high quality video and audio feed of live events over the Internet in a cost effective manner. Rather than attempting to encode video feed from the live event at a single bitrate, an embodiment of the present disclosure encodes the live event with a high quality version of video from the live event and encodes multiple copies of it using a codec such as MPEG-4 H.264. These copies are at various bitrates and resolutions ranging from lower quality renditions appropriate for slower wireless connections, up to extremely high quality renditions suitable for fast devices on fast networks. The renditions are then wrapped into a transport stream such as the MPEG-2 transport streams ("bitrate streams") and segmented into segments (e.g., ten second segments). These segments are then broadcasted using a satellite uplink router configured to receive the bitrate streams using an HTTP protocol and transmit them to a satellite for distribution to one or more downlink servers for distribution on the Internet. These bitrate streams are streamed to an end device. Examples of end devices include, but are not limited to, a video player (e.g. HTML 5 player) on a mobile device (e.g., over a 3G connection), a browser or a set-top box. Because the player receives the video in discrete segments and can detect the quality of the network connection, it can switch to a higher or lower quality video segment between segments if bandwidth conditions change. Depending on the selections of the user of the end device, the end device can be used to play the downloaded bitrate stream contemporaneously with the live event or at some later time. If played at some later time, the bitrate stream can be stored on the end device.

Now that an overview of the present disclosure has been presented, more detailed embodiments are described which, in addition to providing for improved sound, also provide for higher quality experience than simple use of adaptive bitrate streaming. Moreover, the disclosed further details have the advantage that they provide a high quality experience using a simple set of rack mounted equipment. As such, the disclosed systems and methods provide for enhanced visual feed over the Internet without reliance on excessive audio/visual equipment. The disclosed systems and methods are portable and do not rely upon resources that will not realistically be available at a live event venue.

One aspect of the present disclosure provides a portable system for distributing an audio/visual feed of a live event (e.g., a concert, a speech, a rally, a protest, or an athletic game or contest). The portable system comprises a first ambient microphone positioned at a first location relative to the live event (e.g., on a first side of the live event) and a second ambient microphone positioned at a second location relative to the live event (e.g., on a second side of the live event). The portable system further comprises a sound mixer. The sound mixer is configured to receive and mix together (i) a first ambient audio signal from the first ambient microphone, (ii) a second ambient audio signal from the second ambient microphone, and (iii) a sound board feed from a public address system associated with the live event (e.g., the event producer's switcher), thereby forming a mixed audio signal. The portable system further comprises a plurality of video cameras positioned and configured to record the live event.

The portable system further comprises a video board comprising a plurality of video inputs. Each respective video input in the plurality of video inputs receives a video input signal from a corresponding video camera in the plurality of video cameras. The video board further comprises a selection mechanism for selecting the video input signal received by a video input in the plurality of video inputs as a video output from the video board. The portable system further comprises a recorder. The recorder comprises (i) an audio input for receiving the mixed audio signal from the sound mixer and (ii) a video input for receiving the video output from the video board. The recorder is configured to combine the mixed audio signal with the video output from the video board, thereby producing an audio/visual signal. The recorder is configured to output the audio/visual signal. In some embodiments, the audio/visual signal is a composite serial digital interface signal. In other embodiments the audio/visual signal is a signal in some other format.

The portable system further comprises an encoder having an input port for receiving the audio/visual signal. The encoder encodes the audio/visual signal using (i) a first video codec at each of a first plurality of bitrates and (ii) a first audio codec, thereby forming a first plurality of bitrate streams. Each respective bitrate stream in the first plurality of bitrate streams comprises the video portion of the audio/visual signal encoded at a corresponding bitrate in the first plurality of bitrates by the first video codec. The portable system further comprises a satellite uplink router configured to receive the first plurality of bitrate streams using an HTTP protocol, and transmit the first plurality of bitrate streams to a satellite for distribution to one or more downlink servers for distribution on the Internet.

Another aspect of the present disclosure provides a method for distributing an audio/visual feed of a live event. The method comprises mixing together (i) a first ambient audio signal from a first ambient microphone monitoring the live event, (ii) a second ambient audio signal from a second ambient microphone monitoring the live event, and (iii) a sound board feed from a public address system associated with the live event, thereby forming a mixed audio signal. In some embodiments, more than two ambient audio signals (e.g., three or more, four or more, five or more, etc.) are combined with the sound board feed to form the mixed audio signal. The method further comprises receiving a respective video input signal at each respective video input in a plurality of video inputs at a video board from a corresponding camera in a plurality of video cameras. The plurality of video cameras are positioned and configured to record the live event. The method further comprises selecting a video input signal received by a video input in the plurality of video inputs as a video output from the video board and then receiving the mixed audio signal at an audio input of a recorder. The method further comprises receiving the video output from the video board at a video input of the recorder and combining, at the recorder, the mixed audio signal with the video output thereby producing an audio/visual signal. In some embodiments, the audio/visual signal is formatted as a composite serial digital interface signal. In other embodiments, the audio/visual signal is formatted in some other format. The method further comprises receiving the audio/visual signal at an encoder and encoding, at the encoder, the audio/visual signal using (i) a first video codec at each of a plurality of bitrates and (ii) a first audio codec, thereby forming a first plurality of bitrate streams. Each respective bitrate stream in the first plurality of bitrate streams comprises the video portion of the audio/visual signal encoded at a corresponding bitrate in the first plurality of bitrates by the first video codec. The method further comprises receiving the first plurality of bitrate streams at a satellite uplink router using an HTTP protocol and transmitting, using the satellite uplink router, the first plurality of bitrate streams to a satellite for distribution to one or more downlink servers for distribution on the Internet.

In some embodiments, the first ambient audio signal is amplified from the first ambient microphone with a first pre-amplifier prior to the mixing and the second ambient audio signal from the second ambient microphone is amplified with a second pre-amplifier prior to the mixing. In some embodiments, the first ambient audio signal from the first pre-amplifier and the second ambient audio signal from the second pre-amplifier is further amplified with an amplifier prior to the mixing. In some embodiments, the amplifier is further configured to concurrently (i) compress the first ambient audio signal from the first pre-amplifier in accordance with one or more compression parameters before the first ambient audio signal is received by the sound mixer, and (ii) compress the second ambient audio signal from the second pre-amplifier in accordance with one or more compression parameters before the second ambient audio signal is received by the sound mixer. In some embodiments, the one or more compression parameters comprise the set of parameters threshold, compression ratio, attack time, and release time.

In some embodiments, the video input signal from a video camera in the plurality of video cameras is a video serial digital interface signal. In some embodiments, the video input signal from a video camera in the plurality of video cameras is an HDMI signal, and the method further comprises converting the HDMI signal to a video serial digital interface signal prior to the receiving step. In some embodiments, the selecting step, in which a video signal from among the plurality of cameras recording the live event is chosen, comprises displaying a plurality of panels on a touch-screen display, where each respective panel in the plurality of panels displays a respective video input signal received by a corresponding video input in the plurality of video inputs, and receiving a selection of a first panel in the plurality of panels, thereby selecting the video input signal displayed by the first panel.

In some embodiments, method further comprises using the video board to adjust the selected video input signal to one of a plurality of predetermined resolutions. In some embodiments, the plurality of predetermined resolutions comprises 1920×1080i 60, 1920×1080i 59.94, 1920×1080i 50, 1280×720p 60, 1280×720p 59.94 and 1280×720p 50. In some embodiments, the selecting step comprises wiping or transitioning between (i) a first video input signal that was previously selected at the video board and (ii) a second video input signal that is currently selected as the video board.

In some embodiments, the composite serial digital interface signal is a high definition serial digital interface signal. In some embodiments, the first video codec is H.264. In some embodiments, the first audio codec is advanced audio coding (AAC). In some embodiments, the first plurality of bitrate streams is stored in one or more video containers (e.g., an MP4, 3GP, or 3G2 container). In some embodiments, the first plurality of bitrate streams are configured for adaptive bitrate streaming, and the method further comprises downloading the first plurality of bitrate streams of the live event with a downlink server configured to serve the first plurality of bitrate streams to a first plurality of client devices using a first adaptive bitrate streaming protocol. In some embodiments, a client device in the first plurality of client devices is an APPLE iPAD or APPLE iPHONE. In some embodiments, a client device in the first plurality of client devices implements Internet Explorer 9.0 or greater, SAFARI 3.0 or greater, or ANDROID 2.0 or greater. In some embodiments, the first adaptive bitrate streaming protocol is ADOBE dynamic streaming for ADOBE FLASH. In some embodiments, the first adaptive bitrate streaming protocol is APPLE HTTP adaptive streaming. In some embodiments, the first plurality of bitrate streams is served using HTML 5. In some embodiments, the transmitting step transmits the first plurality of bitrate streams to the satellite using a TCP or UDP protocol.

In some embodiments, the encoding further encodes the audio/visual signal using (i) a second video codec at each of a second plurality of bitrates and (ii) a second audio codec, thereby forming a second plurality of bitrate streams. Each respective bitrate stream in the second plurality of bitrate streams comprises the video portion of the audio/visual signal encoded at a corresponding bitrate in the second plurality of bitrates by the second video codec. The second plurality of bitrate streams are received at the satellite uplink router using an HTTP protocol concurrent to when the first plurality of bitrate streams is received. The second plurality of bitrate streams are transmitted, using the satellite uplink router, to the satellite for distribution to one or more downlink servers for concurrent distribution of the first and second plurality of bitrate streams on the Internet. In some embodiments, the first plurality of bitrate streams is configured for a first adaptive bitrate streaming protocol and the second plurality of bitrate streams is configured for a second adaptive bitrate streaming protocol and the method further comprises concurrently (i) downloading the first plurality of bitrate streams of the live event and serving the first plurality of bitrate streams to a first plurality of client devices using the first adaptive bitrate streaming protocol and (ii) downloading the second plurality of bitrate streams of the live event and serving the second plurality of bitrate streams to a second plurality of client devices using the second adaptive bitrate streaming protocol. In this way, client devices that do not support the same adaptive bitrate streaming protocols and/or codecs can concurrently receive one or more bitrate streams of the live event. For example, in some such embodiments, a client device in the first plurality of client devices is an APPLE iPAD or APPLE iPHONE, a client device in the second plurality of client devices implements Internet Explorer 9.0 or greater, the first adaptive bitrate streaming protocol is APPLE HTTP adaptive streaming, and the second adaptive bitrate streaming protocol is ADOBE dynamic streaming for FLASH. In some embodiments, the method further comprises serving the first plurality of transmitted bitrate streams and the second plurality of transmitted bitrate streams using HTML5. In some embodiments, the first and second plurality of bitrate streams are each transmitted to the satellite using a TCP or UDP protocol. In some embodiments, the first and second audio codec is the same. In some embodiments, the first and second plurality of bitrate streams are each stored in a video container (e.g., 3GP, or 3G2).

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

Figure 1:
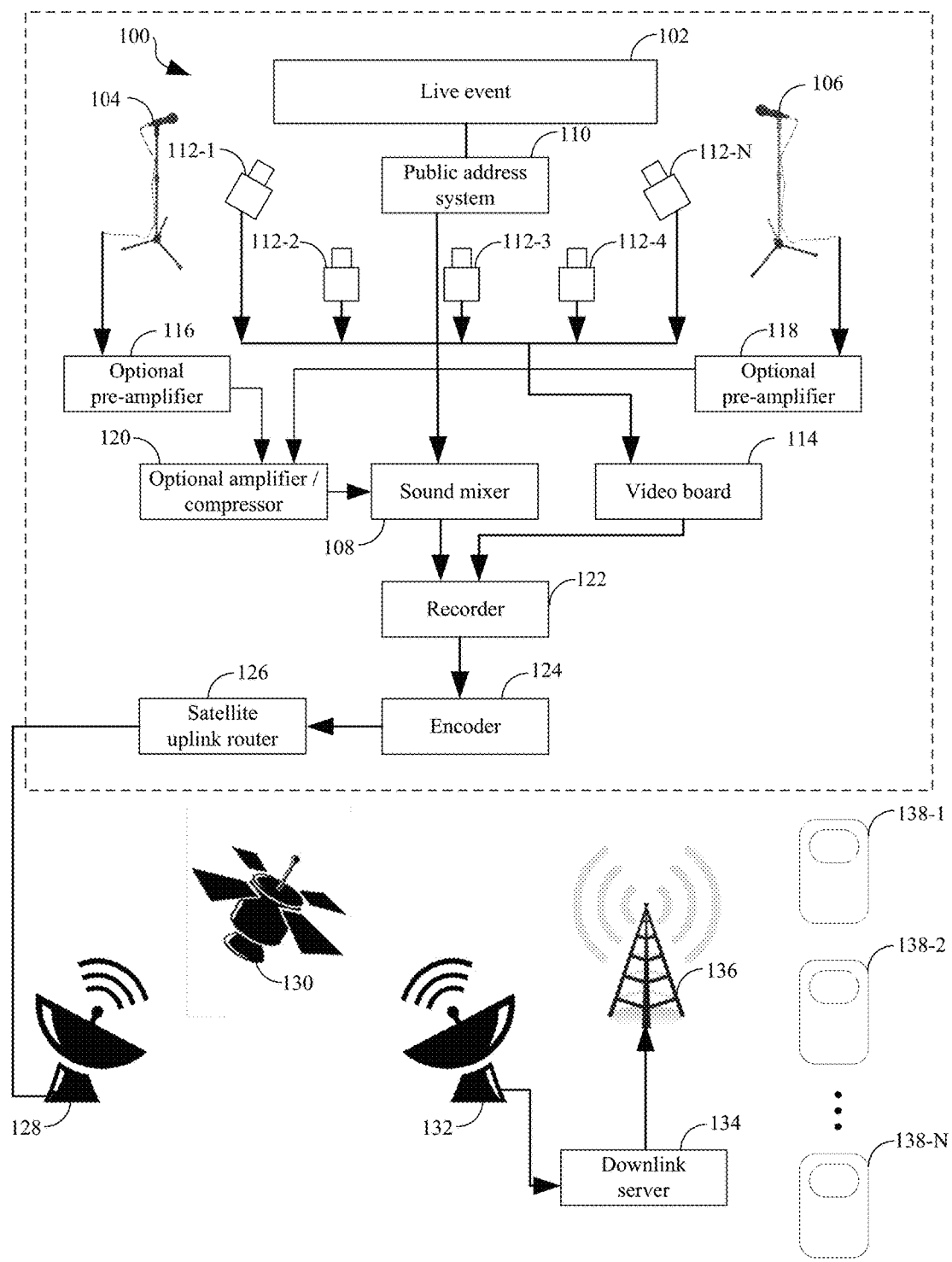
FIG. 1 is a block diagram illustrating a portable system for distributing an audio/visual feed of a live event, according to some embodiments.

The present disclosure provides systems and methods for distributing an audio/visual feed of a live event (e.g., a concert, a speech, a rally, a protest, an athletic game, or a contest). The audio/visual feed includes a mixed audio signal comprising a mixture of ambient audio signals, from ambient microphones monitoring the live event, and sound board feed from the live event public address system. The combination of the ambient noise, which includes audience noise, and the dry sound board signal from the public address system provides a rich sound that gives the listener a sense that they are actually attending the live event.

To complete the audio/visual feed, video signals are received at each video input in a plurality of video inputs at one or more video boards from corresponding cameras recording the event. One of the video input signals in the audio/visual feed is selected as the video board output. Ultimately, the video board output is combined with the mixed audio signal to form the audio/visual feed. Typically, at any given moment, the choice of which of the video input signals is selected as the output signal is determined by which camera is currently getting the best or preferred picture of the "action" at the live event. Further, in typical embodiments, this video signal selection is performed using the judgment and selection of a human operator of selection equipment associated with the video board. In other embodiments, this video signal selection is performed without human intervention. For instance, in some embodiments, in one embodiment each of the video inputs is successively selected as the output signal in round robin, or some other repeating, fashion.

The selected video board output is combined with the mixed audio signal thereby producing an audio/visual signal. The audio/visual signal is encoded using a video codec, at each of several bitrates, and an audio codec (optionally at several different bitrates too), thereby forming several bitrate streams each of which comprises the video portion of the audio/visual signal at a unique bitrate. The bitrate streams are received by one or more satellite routers and transmitted to a satellite which sends them to one or more downlink servers for Internet distribution.

Advantageously, the disclosed systems and methods make use of portable equipment that does not exceed the available resources of a live event forum. That is, advantageously, the disclosed systems and methods do not require direct access to high speed internet at the site of the live event (the live event forum). Nor do the disclosed systems and methods require a truckload of expensive equipment associated with the broadcast of satellite television in order to distribute the live event. Moreover, because the live event is encoded at several different bitrates, adaptive bitrate streaming can be used to communicate the live event to devices that have disparate connectively quality of service (QOS) such that those devices that have excellent connectivity QOS request a bitrate stream that encodes the live event at a high bitrate and those devices that have reduced connectivity QOS request a bitrate stream that encodes the live event at a lower bitrate.

Now that an overview of the systems and methods have been disclosed, a portable system 100 for distributing an audio/visual feed of a live event 102 is disclosed in further detail with reference to FIG. 1. A first ambient microphone 104 is positioned at a first position relative to the live event (e.g., on a first side of the live event). A second ambient microphone 106 is positioned at a second position relative to the live event (e.g., on a second side of the live event). In some embodiments, additional microphones (not shown) are positioned relative to the live event.

Non-limiting examples of suitable microphones 104/106 in accordance with some embodiments of the present disclosure are the NEUMANN U87 Ai/SETZ, TLM-102, TLM 49, TLM 103, KMS 105 MT, and TLM-102 microphones. Non-limiting suitable microphones also include phantom-powered condenser microphones.

A sound mixer 108 is configured to receive and mix together (i) a first ambient audio signal from the first ambient microphone 104, (ii) a second ambient audio signal from the second ambient microphone 106, and (iii) a sound board feed from a public address system 110 associated with the live event, thereby forming a mixed audio signal. In some embodiments, there are more than two ambient microphones that are mixed by sound mixer 108 (e.g., three or more, four or more, etc.). Moreover, it will be appreciated that more than one sound mixer 108 can be used to accomplish this mixing task and such configurations are within the scope of the present disclosure. Nonlimiting examples are the MACKIE 802-VLZ3 8-Channel Analog Audio Mixer, the SAMSON Audio L1200 Live 12-Channel/4-Bus Mixing Console, the SAMSON Audio L2400 Live 12-Channel/4-Bus Mixing Console, the MACKIE ONYX 1640i-16-channel/4-bus Premium Firewire Recording Mixer, the BEHRINGER Sx2442fx Pro Audio Dj Pa 24 Input 4 Bus Studio Live, the ALLEN & HEATH Mix Wizard 3 14:4 Sound Reinforcement Audio Mixer, the BEHRINGER EURODESK SX3242FX Audio Mixer, the MACKIE 2404-VLZ3 24-Channel 4 Buss Recording/Live Audio Mixer, and the PROEL M16usb Audio Mixer, to name a few. In some embodiments, the sound mixer 108 is lightweight and portable so that it can be easily transported to the live event.

In some embodiments, the public address system 110 is not part of the portable system 100. Rather, the public address system 110 is a collection of microphones and other audio equipment that is designed to capture the sound of one or more of the performers of the live event. For instance, in some instances, the public address system includes a separate microphone for each of the performers of the live event. In some instances, the live event is a music concert and the public address system includes a microphone or audio feed for each of the music instruments used at any given time during the concert. The public address system 110 is distinguished over ambient microphones 104 and 106 in that the ambient microphones are intended to capture, at least in part, sound made by the live event audience physically attending the live event in addition to the performers of the live event whereas the public address system 110 is intended to capture the performers of the live event 102 rather than the live event audience.

As seen in FIG. 1, there is a plurality of video cameras 112 positioned and configured to record the live event. In some embodiments, there are two, three, four, five, six, seven, or eight or more cameras 112 positioned and configured to record the live event. In some embodiments, each video camera 112 is a PANASONIC HPX-250. Nonlimiting examples of the video camera 112 in other embodiments of the present disclosure include, but are not limited to, the CANON XH A1, CANON XH G1, PANASONIC AG-HVX200, PANASONIC AG-DVX100B, SONY HDR-FX1, CANON XL2, CANON GL1, SONY HANDYCAM HDR-AX2000, PANASONIC AG-HMC150, PANASONIC AVC-CAM AG-AC160, SONY HANDYCAM HDR-FX1000, PANASONIC AVCCAM AG-AF100, SONY HVR-V1U, CANON XH A1S, SONY HVR-Z7U, CANON EOS C300, SONY HXR-NXSU, CANON XF100, CANON XL H1S, and the CANON XF305 cameras.

In some embodiments, a video camera 112 outputs a high-definition multimedia interface (HDMI) signal (e.g., HDMI 1.0, 1.2, 1.3, or 1.4). HDMI uses the Consumer Electronics Association/Electronic Industries Alliance 861 standards. HDMI 1.0 to HDMI 1.2a uses the EIA/CEA-861-B video standard, HDMI 1.3 uses the CEA-861-D video standard, and HDMI 1.4 uses the CEA-861-E video standard. In some embodiments, this HDMI signal is converted to a serial digital interface (SDI) signal prior to being input into the video board 114 (or the video board 114 converts the HDMI signal into an SDI signal). In some embodiments, the video camera 112 directly outputs an SDI or high definition SDI signal. High-definition serial digital interface (HD-SDI) is standardized in SMPTE 292M and provides a nominal data rate of 1.485 Gbit/s. See Rumsey and Watkinson, *Digital Interface Handbook*, Third Edition, 2004, Focal Press, Burlington Mass., which is hereby incorporated by reference herein in its entirety.

As illustrated in FIG. 1, a video board 114 comprising a plurality of video inputs receives the video signals from the plurality of video cameras 112. Specifically, each respective video input in a plurality of video inputs of the video board 114 receives a video input signal from a corresponding video camera 112 in the plurality of video cameras. The video board 114 further comprises a selection mechanism for selecting the video input signal received by a video input in the plurality of video inputs as a video output from the video board. For instance, in some embodiments, the selection mechanism comprises a display having a plurality of panels, where each respective panel in the plurality of panels displays a respective video input signal received by a corresponding video input in the plurality of video inputs. At any given time, the user selects the panel that contains the desired video input signal that is to be used as the video output of the video board 114. This can be done, for example, by pressing a button associated with the screen. In another example, the screen is a touchscreen display and the selection is made by touching the desired panel. In some embodiments, the selection mechanism is configured to wipe or transition between (i) a first video input signal that was previously selected as the video output from the video board 114 and (ii) a second video input signal that is currently selected as the video output from the video board. A wipe or transition "wipes" or otherwise transitions the first input signal in a growing predetermined pattern and replaces it with the second video input signal. Such growing predetermined patterns can simulate, for example, the turning of a page. Such growing predetermined patterns can, for example, introduce the second video input signal on one or more borders of the screen and grow across the screen until none of the original video input signal remains. An example of a video board 114 that support such a feature is the DATAVIDEO TECHNOLOGIES Co., Ltd. SE-3000. The Instructions Manual for the SE-3000, "8/16 Channel Switcher SE-3000 Instruction Manual", 2011, Datavideo Technologies, Ltd., details numerous wipes or transitions and is hereby incorporated by reference.

In some embodiments, the video board 114 is a multi-channel (e.g., eight or sixteen) high definition SDI video switcher having a main unit that can be mounted in a standard nineteen inch rack so that it is portable. A separate control unit can then be placed on a nearby flat work surface or built into a gallery or OB van desk. In some embodiments, the control panel and main unit communicate via a standard (straight through) Ethernet patch cable.

In some embodiments, the video board 114 accepts HD-SDI inputs from the plurality of video cameras 112. In some embodiments the video board 114 synchronizes the input channels internally without the need for external genlock, although in some embodiments an external reference is looped through the video board 114 to minimize the delay through the switcher. In some embodiments, each input channel is also provided with its own color processor or processor amplifier.

In some embodiments, the video board 114 provides a multi-image preview, e.g., via DVI-D or HD-SDI (BNC), that can be fed to one or two large format LCD monitor screens, thereby keeping the number of required monitors to a minimum. In some embodiments, the video board 114 provides user delegated auxiliary HD-SDI outputs. In some embodiments, the video board 114 provides high definition preview and program outputs via HD-SDI (BNC) and Component (Y, Pb, Pr). In some embodiments, the video board 114 provides mixer features such as picture in picture (PiP), cut, wipe and mix (dissolve) transitions between a first selected video input signal image and a second selected video input signal. The Instructions Manual for the SE-3000, "8/16 Channel Switcher SE-3000 Instruction Manual", 2011, Datavideo Technologies, Ltd., details numerous PiP, cut, wipe and mix transitions and is hereby incorporated by reference.

In some embodiments, the video board 114 is configured to perform advanced digital video effects (DVE), such as three-dimensional page turn transitions. In some embodiments, the video board 114 is configured to produce a multi-image output with key and fill layers. In some embodiments, the video board 114 allows a choice of background image/video one or more picture-in-picture (PiP) windows at the output video which can be sized, rotated, positioned and cropped. In some embodiments, the video board 114 allows the PiP windows to have user defined colored borders. In some embodiments, the video board 114 provides for a resolution of the video output from the video board to be set to one of a plurality of predetermined resolutions (e.g., 1920×1080i 60, 1920×1080i 59.94, 1920×1080i 50, 1280× 720p 60, 1280×720p 59.94, 1280×720p 50, etc.).

Referring to FIG. 1, in some embodiments the portable system 100 comprises an optional first pre-amplifier 116 for amplifying the first ambient audio signal from the first ambient microphone before the first ambient audio signal is received by the sound mixer 108 and a second optional pre-amplifier 118 for amplifying the second ambient audio signal from the second ambient microphone before the second ambient audio signal is received by the sound mixer 108. In some embodiments, where more than two microphones are used to collect ambient sound, there are a matching number of preamplifiers, with each ambient microphone having a corresponding preamplifier. In some embodiments, the portable system 100 does not comprise a pre-amplifier 116 or a pre-amplifier 118.

In some embodiments, portable system 100 comprises an amplifier 120 configured to (i) amplify the first ambient audio signal from the first pre-amplifier 116 before the first ambient audio signal is received by the sound mixer 108 and (ii) amplify the second ambient audio signal from the second pre-amplifier 118 before the second ambient audio signal is received by the sound mixer 108. In some embodiments, the amplifier 120 is further configured to compress the first ambient audio signal from the first ambient microphone 104 in accordance with one or more compression parameters before the first ambient audio signal is received by the sound mixer 108. An example of an amplifier that is in accordance with some embodiments of the present disclosure is the APPLIED RESEARCH AND TECHNOLOGY Pro VLA II two channel tube leveling amplifier. In some embodiments, the amplifier 120 is further configured to compress the second ambient audio signal from the second ambient microphone 106 in accordance with one or more compression parameters before the second ambient audio signal is received by the sound mixer 108. In some embodiments, the one or more compression parameters are a plurality of parameters comprising a threshold, a compression ratio, an attack time, and a release time.

Threshold defines a predefined decibel value at which point the amplifier 120 will begin compression (reducing the decibel rating) of the ambient audio signal from the ambient microphones. In some embodiments a different threshold setting can be applied to each of the input ambient audio signals.

The compression ratio selects the amount of compression applied to the ambient audio signal from the ambient microphones once that signal reaches or exceeds the threshold. In some embodiments, this compression amount is expressed as a ratio of input to output. For example, when a 4:1 compression ratio is chosen, for every 4 dB over the threshold the ambient audio signal from the ambient microphones rises, the output level only rises by 1 dB. In this case if the input signal increased 12 dB over the threshold, the output level would only rise by 3 dB over the threshold.

The attack time is the length of the temporal delay before the compressor/limiter responds to an increase in signal level (by reducing gain). The attack time is used to control the shape the "front end" of the dynamics envelope. For example, a short attack makes a snare hit sound "thin". But as the attack time is increased, the same snare hit will provide more of a thump in the compressed snare. The downside of an increased attack time is that it creates an overshoot, (or "transient"), the length of which is the time set by the ATTACK control. Overshoots less than one millisecond are hard to hear even when they are clipped. If the ATTACK is set too fast, the gain may be reduced too much and thereby create a "pumping" sound. "Pumping" means that it sounds like the signal is muted when it shouldn't be muted.

The release time is the amount of time it takes the compressor to increase the gain after the input level drops. Longer settings maintain the dynamics of the input signal, while shorter settings reduce the dynamics. Shorter settings will also increase the apparent reverberation, and at extreme gain reduction settings, lead to breathing artifacts. Breathing is the sound of the compressor/limiter turning up the gain so quickly you can hear breathing noises between words during vocal processing.

Referring to FIG. 1, a recorder 122 having (i) an audio input for receiving the mixed audio signal from the sound mixer 108 and (ii) a video input for receiving the video output from the video board 114 is configured to combine the mixed audio signal with the video output from the video board, thereby producing an audio/visual signal. In some embodiments, the recorder 122 is configured to record the audio and video input using a codec. Exemplary codecs include, but are not limited to, the APPLE ProRes 422, APPLE ProRes 422 (HQ), APPLE ProRes 422 (LT), and APPLE ProRes 422 (Proxy) codecs. In some embodiments, the recorder 122 is a KiPro (AJA Video Systems, Grass Valley, Calif.). Advantageously, in some embodiments, the recorder 122 is used to record the event. This recording can be used subsequently by live event performers to improve the quality of future shows, distribution to fans, production purposes, distribution from an Internet website, and the like. The recorder 122 is configured to output the audio/visual signal as a composite serial digital interface signal. In some embodiments, this output composite serial digital interface signal is not encoded using a codec. In some embodiments, this output composite serial digital interface signal is encoded using a codec. In some embodiments, the output composite serial digital interface signal is a high definition serial digital interface signal.

An encoder 124 having an input port receives the composite serial digital interface signal from the recorder 122. The encoder 124 encodes the composite serial digital interface signal using a first video codec at each of a first plurality of bitrates. The encoder 124 also encodes the composite serial digital interface signal using a first audio codec. This results in a plurality of bitrate streams. Each of these bitrate streams comprises the video portion of the composite serial digital interface signal encoded at a corresponding bitrate in the first plurality of bitrates by the first video codec.

In some embodiments, the first video codec is H.264 or an advanced video coding (AVC) also known as MPEG-4 Part 10. H.264/MPEG-4 Part 10 or AVC is a standard for video compression, and is suitable for the recording, compression, and distribution of high definition video. H.264/MPEG-4 AVC is a block-oriented motion-compensation-based codec standard developed by the ITU-T Video Coding Experts Group (VCEG) together with the International Organization for Standardization (ISO)/International Electrotechnical Commission (IEC) joint working group, the Moving Picture Experts Group (MPEG). The product of this partnership effort is known as the Joint Video Team (JVT). The ITU-T H.264 standard and the ISO/IEC MPEG-4 AVC standard (formally, ISO/IEC 14496-10-MPEG-4 Part 10, Advanced Video Coding) are jointly maintained. The standard is suitable for streaming videos on the Internet and is supported by web software such as the ADOBE FLASH Player and MICROSOFT Silverlight. Moreover, the standard can be used for satellite communications (DVB-S and DVB-S2).

In some embodiments the first plurality of bitrate streams are stored in one or more video containers (e.g., an MP4, 3GP, or 3G2 container). MPEG-4 Part 14 or MP4 (formally ISO/IEC 14496-14:2003) is a multimedia container format standard specified as a part of MPEG-4. It is most commonly used to store digital video and digital audio streams, especially those defined by MPEG, but can also be used to store other data such as subtitles and still images. MPEG-4 Part 14 allows streaming over the Internet. A separate hint track is used to include streaming information in the file. The official filename extension for MPEG-4 Part 14 files is .mp4. MPEG-4 Part 14 is an instance of more general ISO/IEC 14496-12:2004 (MPEG-4 Part 12: ISO base media file format) which is directly based upon QuickTime File Format. MPEG-4 Part 14 is similar to the QuickTime file format, but formally specifies support for Initial Object Descriptors (IOD) and other MPEG features. MPEG-4 Part 14 redefines 13 of ISO/IEC 14496-1 (MPEG-4 Part 1: Systems), in which the file format for MPEG-4 content was previously specified. The MPEG-4 file format, version 1 was published in 2001 as ISO/IEC 14496-1:2001, which is a revision of the MPEG-4 Part 1: Systems specification published in 1999 (ISO/IEC 14496-1:1999). The original version of the MP4 file format has been revised and replaced by MPEG-4 Part 14: MP4 file format (ISO/IEC 14496-14: 2003), commonly named as MPEG-4 file format version 2. The MP4 file format was generalized into the ISO Base Media File format ISO/IEC 14496-12:2004, which defines a general structure for time-based media files. It in turn is used as the basis for other file formats in the family (for example MP4, 3GP, Motion JPEG 2000). 3GP (3GPP file format) is a multimedia container format defined by the Third Generation Partnership Project (3GPP) for 3G UMTS multimedia services. It is used on 3G mobile phones but can also be played on some 2G and 4G phones. 3G2 (3GPP2 file format) is a multimedia container format defined by the 3GPP2 for 3G CDMA2000 multimedia services. It is similar to the 3GP file format, but has some extensions and limitations in comparison to 3GP. The 3GP and 3G2 file formats are both structurally based on the ISO base media file format defined in ISO/IEC 14496-12-MPEG-4 Part 12. 3GP and 3G2 are container formats similar to MPEG-4 Part 14 (MP4), which is also based on MPEG-4 Part 12. The 3GP and 3G2 file formats were designed to decrease storage and bandwidth requirements in order to accommodate mobile phones. 3GP and 3G2 are similar standards, but with some differences. The 3GPP file format was designed for GSM-based Phones and may have the filename extension .3gp. The 3GPP2 file format was designed for CDMA-based Phones and may have the filename extension .3g2. The 3GP file format stores video streams as MPEG-4 Part 2 or H.263 or MPEG-4 Part 10 (AVC/H.264), and audio streams as AMR-NB, AMR-WB, AMR-WB+, AAC-LC, HE-AAC v1 or Enhanced aac-Plus (HE-AAC v2). 3GPP allows use of AMR and H.263 codecs in the ISO base media file format (MPEG-4 Part 12), because 3GPP specifies the usage of the Sample Entry and template fields in the ISO base media file format as well as defining new boxes to which codecs refer. For the storage of MPEG-4 media specific information in 3GP files, the 3GP specification refers to MP4 and the AVC file format, which are also based on the ISO base media file format. The MP4 and the AVC file format specifications described usage of MPEG-4 content in the ISO base media file format. The 3G2 file format can store the same video streams and most of the audio streams used in the 3GP file format. In addition, 3G2 stores audio streams as EVRC, EVRC-B, EVRC-WB, 13K (QCELP), SMV or VMR-WB, which is specified by 3GPP2 for use in ISO base media file format. For the storage of MPEG-4 media (AAC audio, MPEG-4 Part 2 video, MPEG-4 Part 10-H.264/AVC) in 3G2 files, the 3G2 specification refers to the MP4 file format and the AVC file format specification, which describes usage of this content in the ISO base media file format. For the storage of H.263 and AMR content, the 3G2 specification refers to the 3GP file format specification.

In some embodiments the first plurality of bitrate streams are stored in advanced systems format. Advanced Systems Format (formerly Advanced Streaming Format, Active Streaming Format) is a proprietary digital audio/digital video container format, especially meant for streaming media. ASF is part of the Windows Media framework. The most common file types contained within an ASF file are Windows Media Audio (WMA) and Windows Media Video (WMV). Accordingly, in some embodiments, the first video codec is a WMV codec and the plurality of bitrate streams are encoded in WMV and the first audio codec is a WMA codec.

The file extension ".WMV" typically describes ASF files that use Windows Media Video codecs. The audio codec used in conjunction with Windows Media Video is typically some version of WMA. Alternatives for WMV include, but are not limited to, MPEG-4 AVC, AVS, RealVideo, and MPEG-4 ASP. An original version of the codec is WMV 7. Continued development led to WMV 9. While all versions of WMV support variable bit rate, average bit rate, and constant bit rate, WMV 9 includes native support for interlaced video, non-square pixels, frame interpolation, and a profile titled Windows Media Video 9 Professional, which is activated automatically whenever the video resolution exceeds 300,000 pixels (e.g., 528×576, 640×480 or 768×432 and beyond) and the bitrate 1000 kbit/s. WMV 9 support video content at resolutions such as 720p and 1080p. In some embodiments, the WMV codec is VC-1 (SMPTE reference SMPTE 421M).

Windows Media Audio (WMA) is an audio data compression technology developed by MICROSOFT. The name interchangeably refers to its audio file format and to its audio codecs. It forms part of the Windows Media framework. WMA comprises several distinct codecs including WMA, WMA Pro, a newer and more advanced codec which supports multichannel and high resolution audio, WMA Lossless, a lossless codec that compresses audio data without loss of audio fidelity (the regular WMA format is lossy), as well as WMA Voice, which is targeted at voice content and applies compression using a range of low bit rates.

In some embodiments the first plurality of bitrate streams are stored in MPEG-2 format. In some embodiments in which the first plurality of bitrate streams are stored in MPEG-2 format, the first audio codec is MPEG-2 Part 7, advanced audio coding, and the first video codec is MPEG-2 Part 2, H.262.

In some embodiments, the encoder 124 is selected from CISCO media processor family, formerly the Spinnaker family. In some embodiments, the encoder is a CISCO AS3005 series media processor (Spinnaker 3005), a CISCO AS5100 series media processor (Spinnaker SD/5000), a CISCO AS6000 Series Media Processor (Spinnaker IP/6000), a CISCO AS7100 Series Media Processor (Spinnaker HD/7100), or a CISCO AS8100 Series Media Processor (Spinnaker HD-X/8100). In some embodiments, the first video codec and the first audio codec are each in a format supported by the CISCO media processor family.

Referring to FIG. 1, system 100 further comprises a satellite uplink router 126 that is configured to receive the first plurality of bitrate streams using an HTTP protocol and transmit the first plurality of bitrate streams to a satellite for distribution to one or more downlink servers for distribution on the Internet. In some embodiments, satellite uplink router 126 is an iDIRECT iNFINITI 5000 series satellite router (iDirect, Inc., Herndon, Va.). In some embodiments, the satellite uplink router 126 is configured to transmit the first plurality of bitrate streams to the satellite using a TCP or UDP protocol.

Using the satellite uplink router 126, the portable system 100 sends the first plurality of bitrate streams, encapsulated in packets (e.g., TCP or UDP packets) through uplink antenna 128 to a satellite 130, where they are then sent to one or more downlink antennas 132 and communicated to one or more downlink servers 134. In some embodiments, the one or more downlink servers 134 then communicate the first plurality of bitrate streams to one or more cellular antennas 136 for wireless distribution to one or more devices 138. In some embodiments, a client device 138 in the first plurality of client devices 138 is an APPLE iPAD or APPLE iPHONE. In some embodiments, a client device in the first plurality of client devices implements Internet Explorer 9.0 or greater, SAFARI 3.0 or greater, or ANDROID 2.0 or greater. In some embodiments, the one or more downlink servers 134 then communicate the first plurality of bitrate streams through a wired Internet connection (e.g., one or more ISPs) to a plurality of devices that are physically connected to the Internet or related packet-based network.

In some embodiments, the first plurality of bitrate streams are configured for adaptive bitrate streaming and the downlink server 134 is configured to download the first plurality of bitrate streams of the live event and serve the first plurality of bitrate streams to a first plurality of client devices 138 using an adaptive bitrate streaming protocol across a cellular network. In some embodiments, the adaptive bitrate streaming protocol is ADOBE dynamic streaming for FLASH. For instance, in some embodiments the adaptive bitrate streaming protocol is ADOBE dynamics streaming for FLASH (e.g., Flash Player 10, 10.1 or AIR 2) and the first video codec is H.264 and the first audio codec is advanced audio coding (AAC). In such embodiments, downlink server 134 includes or is in electronic communication with a flash media server (e.g., Flash Media Interactive Server, Flash Media Streaming Server, Flash Media Development Server, etc.). The flash media server handles the actual switching of the streams in the plurality of bitrate streams for any given device 138 based on the client-originated request to do so. Once the server 134 receives the request to switch the user's stream to a different stream (bandwidth), it waits a short period for the optimal point to switch with minimal playback impact to the user. This occurs on the nearest keyframe for video-only content, the nearest audio sample for audio-only streams, and the combination of the two for video content with audio. This means that video encoded with a keyframe every six seconds could take up to six seconds, once the command to switch streams has been received by the server, to actually switch the content (switch from one bitrate stream to another) and send the transition-complete notification. As such, Flash Media Server is a hub on which media such as video and audio files are physically located. When accessed by a device 138, the video player (SWF file) on the device 138 makes a call to the server (e.g., server 134) using the real time messaging protocol (called an RTMP address), locates the media file, and starts to play it as soon as they arrive in the browser running adobe flash player on the device 138. There is no waiting for some of the content to load and nothing is downloaded to the browser's cache at all. RTMP is a proprietary protocol which uses TCP (transmission control protocol) for the transmission of data packets between Flash Player and Flash Media Server. ADOBE dynamic streaming for FLASH is designed to deliver video (FLV, MP4, and MOV) and audio (MP3, AAC, and Nellymoser) files in a MP4 container to a SWF embedded in a web page, on a device 138.

In some embodiments, the adaptive bitrate streaming protocol that is used to download one of the plurality of bitrate streams from the downlink server 134 to a device 138 is APPLE HTTP adaptive streaming.

In some embodiments, the adaptive bitrate streaming protocol that is used to download one of the plurality of bitrate streams from the downlink server 134 to a device 138 is 3GPP/MPEG DASH. The 3GPP/MPEG DASH adaptive streaming protocol is designed to deliver video (H.264) and audio (AAC) files encoded in a MPEG-2 or MP4 container.

In some embodiments, the adaptive bitrate streaming protocol that is used to download one of the plurality of bitrate streams from the downlink server 134 to a device 138 is MICROSOFT Smooth Streaming. The MICROSOFT Smooth Streaming adaptive streaming protocol is designed to deliver video (H.264) and audio (AAC, WMA) encoded in a MP4 container.

In some embodiments, the adaptive bitrate streaming protocol that is used to download one of the plurality of bitrate streams from the downlink server 134 to a device 138 is 3GPP RTSP Streaming. The 3GPP RTSP Streaming adaptive streaming protocol is designed to deliver video (H.263, H.264, MPEG-4) and audio (AAC, AMR) encoded in TRP packets.

In some embodiments, the downlink server 134 is configured to serve the plurality of bitrate streams using HTML5. In other words, the bitrate streams are encoded using HTML5. HTML5 includes a <video> tag that is not present in prior versions of HTML. In some embodiments, each bitrate stream is encoded as a video and designated using the <video> tag in HTML5. By use of the <video> tag in HTML5, there is no need for additional plug-in software like Flash, Silverlight and QuickTime to run the video on devices 138.

In some embodiments, the connection between cellular antenna 136 and a device 138 is a 3G or a 4G connection. In some embodiments, a 4G system provides mobile broadband Internet access to devices 138. One advantage of 4G is that it can, at any point of device 138 travelling time, provide an internet data transfer rate higher than any existing cellular services (excluding broadband and Wi-Fi connections).

In some embodiments, the encoder 124 further encodes the composite serial digital interface signal using (i) a second video codec at each of a second plurality of bitrates and (ii) a second audio codec, thereby forming a second plurality of bitrate streams, each respective bitrate stream in the second plurality of bitrate streams comprising the video portion of the composite serial digital interface signal encoded at a corresponding bitrate in the second plurality of bitrates by the second video code. In such embodiments, the satellite uplink router 126 is further configured to receive the second plurality of bitrate streams using an HTTP protocol while also receiving the first plurality of bitrate streams. The second plurality of bitrate streams are transmitted to the satellite 130 for distribution to one or more downlink servers 134 for concurrent distribution of the first plurality of bitrate streams and the second plurality of bitrate streams on the Internet. This is particularly advantageous for reaching devices 138 that do not all support the same codes. For instance, in some embodiments, the first plurality of bitrate streams employ one or more codecs in a first set of codecs and the second plurality of bitrate streams employ one or more codecs in a second set of codecs, where the first set of codecs and the second codecs differ by at least one codec. In one specific embodiment, the first plurality of bitrate streams are configured for a first adaptive bitrate streaming protocol, the second plurality of bitrate streams are configured for a second adaptive bitrate streaming protocol, and the downlink server 134 is configured to concurrently (i) download the first plurality of bitrate streams of the live event and serve the first plurality of bitrate streams to a first plurality of client devices 138 using the first adaptive bitrate streaming protocol and (ii) download the second plurality of bitrate streams of the live event and serve the second plurality of bitrate streams to a second plurality of client devices 138 using the second adaptive bitrate streaming protocol. In one example in accordance with this embodiment, a client device 138 in the first plurality of client devices is an APPLE iPAD or APPLE iPHONE, a client device in the second plurality of client devices 138 implements INTERNET EXPLORER 9.0 or greater, the first adaptive bitrate streaming protocol is APPLE HTTP adaptive streaming, and the second adaptive bitrate streaming protocol is ADOBE dynamic streaming for FLASH. In some embodiments, the downlink server 134 is further configured to serve the first plurality of bitrate streams and the second plurality of bitrate streams using HTML5. In some embodiments, the satellite uplink router is configured to transmit the first plurality of bitrate streams and the second plurality of bitrate streams to the satellite using a TCP or UDP protocol. In some embodiments, the first and second plurality of bitrate streams are stored in one or more video containers (e.g., MP4, 3GP, or 3G2).

FIG. 1 discloses specific components of system 100 such as sound mixer 108, video board 114, recorder 122, encoder 124, and satellite uplink router 126. While a single instance of each of these devices is illustrated in FIG. 1, it will be appreciated that system 100 may include more than one of any of these components. Moreover, there may be any number of uplink antennas 128, satellites 130, downlink antennas 132, downlink servers 134, and cellular antennas 136 to facilitate the systems and methods of the present disclosure. Now that a system in accordance with an embodiment of the present disclosure has been described in conjunction with FIG. 1, a method for distributing an audio/visual feed of a live event is set forth in conjunction with FIG. 2.

Figure 2:
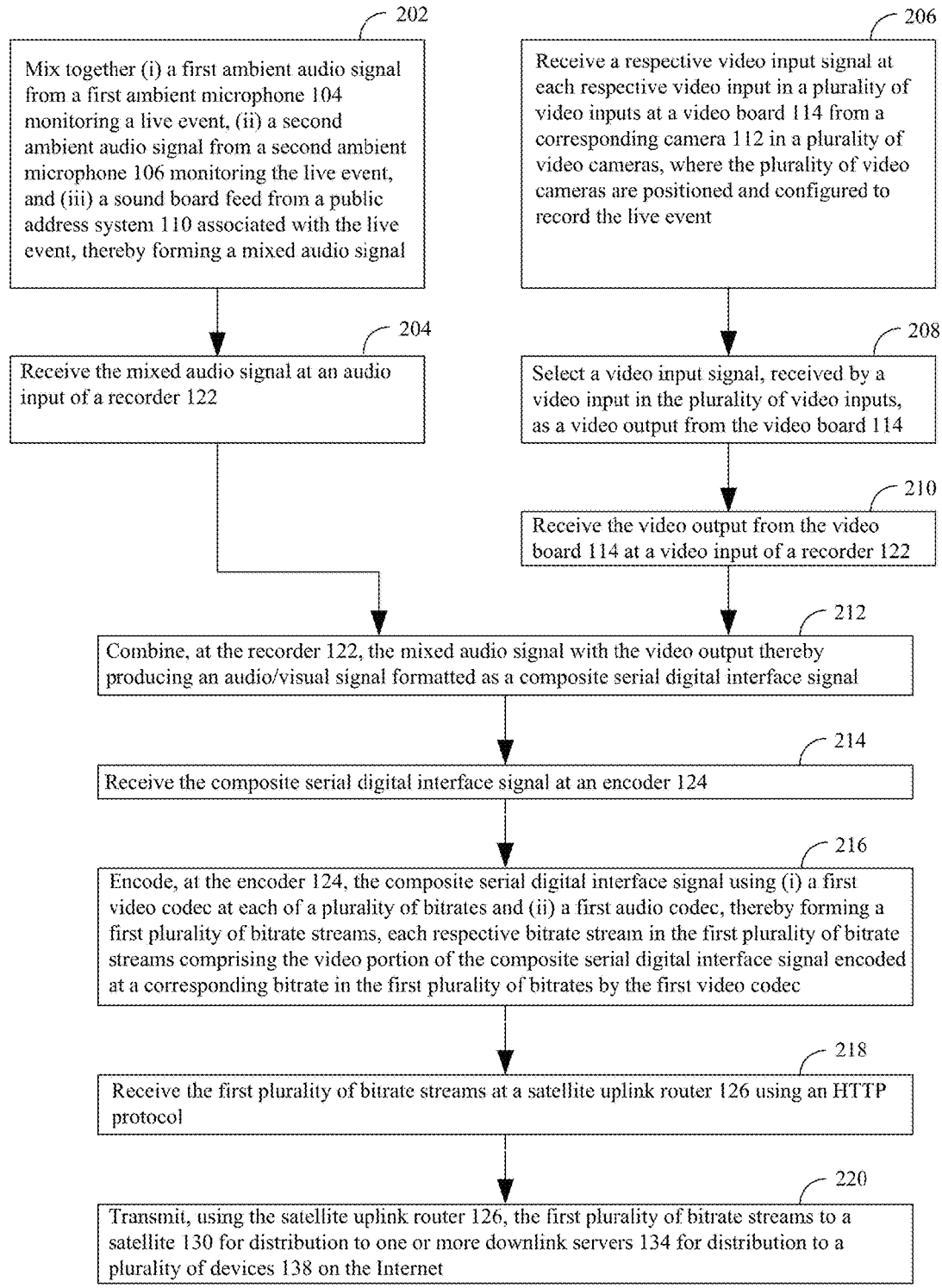
FIG. 2 is a block diagram illustrating an example process for a portable system for distributing an audio/visual feed of a live event, according to some embodiments.

In step 202 of FIG. 2, there is mixed together (i) a first ambient audio signal from a first ambient microphone 104 monitoring a live event, (ii) a second ambient audio signal from a second ambient microphone 104 monitoring the live event, and (iii) a sound board feed from a public address system 110 associated with the live event, thereby forming a mixed audio signal. Typically this mixing takes place at a sound mixer 108. In some embodiments, ambient audio signals from more than two microphones are mixed with the sound board feed at the sound mixer. For example, in some embodiments, ambient audio signals from three or more, four or more, five or more, or six or more microphones are mixed with the sound board free at the sound mixer. In some embodiments, the first ambient audio signal from the first ambient microphone 104 is amplified with a first pre-amplifier 116 prior to the mixing and the second ambient audio signal from the second ambient microphone 106 is amplified with a second pre-amplifier 118 prior to the mixing. In some embodiments, the first ambient audio signal from the first pre-amplifier 116 and the second ambient audio signal from the second pre-amplifier 118 is amplified with the amplifier 120 prior to the mixing. In some embodiments, the amplifier 120 is further configured to concurrently compress the first ambient audio signal from the first pre-amplifier in accordance with one or more compression parameters before the first ambient audio signal is received by the sound mixer as well as compress the second ambient audio signal from the second pre-amplifier 118 in accordance with one or more compression parameters before the second ambient audio signal is received by the sound mixer 108. In some embodiments, the one or more compression parameters is a plurality of parameters comprising a threshold, a compression ratio, an attack time, and a release time.

In step 204, the mixed audio signal is received at an audio input of a recorder 122. In typical embodiments, the output of the sound mixer 108 produced in step 202 is fed to the audio input of the recorder 122 via cable in order to accomplish step 204. In typical embodiments, the mixing at step 202 occurs at a sound mixer 108 and the output of the sound mixer 108 is cabled into the recorder 122. In some embodiments, the data connection between the sound mixer 108 and the recorder 122 is wireless (e.g., 802.11, etc.). In some embodiments the mixed audio signal from the sound mixer 108 is put on magnetic or other fixed media (e.g., DVD, USB key, digital tape, etc.) and physically transported to the recorder 122 to achieve step 204.

In step 206, a respective video input signal is received at each respective video input in a plurality of video inputs at a video board 114 from a corresponding camera 112 in a plurality of video cameras. The plurality of video cameras 112 are positioned and configured to record the live event. In some embodiments the plurality of video cameras consists of two video cameras. In some embodiments the plurality of video cameras consists of three, four, five, six, seven, or eight or more video cameras. In some embodiments, the video input signal from a video camera in the plurality of video cameras is a video serial digital interface signal (e.g., a high definition serial digital interface signal). In some embodiments, the video input signal from a video camera in the plurality of video cameras is an HDMI signal that is converted to a video serial digital interface signal prior to step 206.

In step 208, a video input signal, received by a video input in the plurality of video inputs in step 206, is selected as a video output from the video board 114. In typical embodiments, this selection is done using human intervention. For example, in some embodiments, the operator of a video board 114 reviews the received video input signals as they are concurrently displayed on one or more monitors. In such embodiments, each of the received video input signals is displayed in a separate window on the one or more monitors associated with the video board. The operator of the video board 114 selects one of the displayed video input signals from the one or more display as the video output from the video board. In an exemplary embodiment, a plurality of panels on a touch-screen display are provided, with each respective panel in the plurality of panels displaying a corresponding video input signal received by a corresponding video input in the plurality of video inputs. A selection of a first panel in the plurality of panels is received, thereby selecting the video input signal displayed by the first panel to be the video output of the video board 114. In some embodiments, the video board 114 is used to adjust the video input signal that has been selected as the video output to one of a plurality of predetermined resolutions (e.g., 1920×1080i 60, 1920×1080i 59.94, 1920×1080i 50, 1280×720p 60, 1280×720p 59.94 and 1280×720p 50, etc.). In some embodiments, video board 114 has any number of features that facilitate step 208. For instance, in some embodiments, rather than cutting directly from a first video input signal that has been selected as a video output at a first time to a second video input signal that is selected at a subsequent second time, some embodiments of the selecting step 208 comprise wiping or transitioning between (i) the first video input signal that was previously selected at the video board and (ii) the second video input signal that is currently selected as the video board. This wiping or transitioning involves a gradual removal of portions of the first video input signal and replacement with corresponding parts of the second video input signal on a temporal basis to achieve a smooth transition from the first to the second selected video signal.

In step 210, the video output from the video board 114 is received as a video input at a recorder 122. In typical embodiments this is accomplished by connecting a cable between the video board 114 and the recorder 122. In some embodiments, the data connection between the video board 114 and the recorder 122 is wireless (e.g., 802.11, etc.). In some embodiments the video output from the video board 114 is put on magnetic or other fixed media (e.g., DVD, USB key, etc.) and physically transported to the recorder 122 to achieve step 210.

In step 212 the mixed audio signal is combined with the video output at the recorder 122, thereby producing an audio/visual signal formatted as a composite serial digital interface signal.

In step 214, the composite serial digital interface signal is received at an encoder 124. In typical embodiments this is accomplished by connecting a cable between the recorder 122 and the encoder 124. In some embodiments, the data connection between the recorder 122 and encoder 124 is wireless (e.g., 802.11, etc.). In some embodiments the serial digital interface signal from the encoder 124 is put on magnetic or other fixed media (e.g., DVD, USB key, etc.) and physically transported to the encoder 124 to achieve step 214.

In step 216, the composite serial digital interface signal is encoded at the encoder 124 using (i) a first video codec (e.g., H.264, AAC, etc.) at each of a plurality of bitrates and (ii) a first audio codec, thereby forming a first plurality of bitrate streams, each respective bitrate stream in the first plurality of bitrate streams comprising the video portion of the composite serial digital interface signal encoded at a corresponding bitrate in the first plurality of bitrates by the first video codec. Advantageously, such encoding allows remote devices that have excellent connectivity to download a bitrate stream encoded at a higher resolution bitrate than those remote devices that have reduced connectivity. In this way, such encoding guarantees an optimum viewing experience across a spectrum of bandwidth connectivity rates. Moreover, a remote device can switch from one bitrate stream to another, midstream, to account for abrupt changes in connectivity. In some embodiments, the plurality of bitrate streams consists of two bitrate streams. In some embodiments, the plurality of bitrate streams consists of three bitrate streams, four bitrate streams, five bitrate streams, or between five and twenty bitrate streams. In some embodiments, the plurality of bitrate streams is stored in one or more video containers (e.g., MP4, 3GP, 3G2, etc.).

In step 218 the first plurality of bitrate streams are received at a satellite uplink router 126 using an HTTP protocol. In other words, an HTTP protocol is used to communicate the plurality of bitrate streams from the encoder to the router. The link between the encoder 124 and the satellite uplink router 126 is wired in some embodiments (e.g., a CAT5 cable) whereas in other embodiments the link is wireless (e.g., 802.11).

In step 220, the satellite uplink router 126 is used to transmit the first plurality of bitrate streams to a satellite 130 for distribution to one or more downlink servers 134 for distribution on the Internet. In some embodiments, the first plurality of bitrate streams are configured for adaptive bitrate streaming, and step 220 encompasses downloading the first plurality of bitrate streams of the live event with a downlink server 134 configured to serve the first plurality of bitrate streams to a plurality of client devices 138 using an adaptive bitrate streaming protocol (e.g., ADOBE dynamic streaming for FLASH, APPLE HTTP adaptive streaming, etc.). In some embodiments, the plurality of bitrate streams is served by the downlink server using HTML5. In some embodiments, the transmitting step 220 transmits the plurality of bitrate streams to the satellite using a TCP or UDP protocol.

In some embodiments, a client device 138 in the plurality of client devices is an APPLE iPAD or APPLE iPHONE. In some embodiments, the client device 138 in the plurality of client devices is an APPLE iPAD or APPLE iPHONE and the client device in the first plurality of client devices implements Internet Explorer 9.0 or greater, SAFARI 3.0 or greater, or ANDROID 2.0 or greater.

In some embodiments, the encoding step 216 further encodes the composite serial digital interface signal using (i) a second video codec at each of a second plurality of bitrates and (ii) a second audio codec, thereby forming a second plurality of bitrate streams, each respective bitrate stream in the second plurality of bitrate streams comprising the video portion of the composite serial digital interface signal encoded at a corresponding bitrate in the second plurality of bitrates by the second video code. In such embodiments, the second plurality of bitrate streams is received at the satellite uplink router 126 using an HTTP protocol concurrent to when the first plurality of bitrate streams is received. Moreover, in such embodiments, the second plurality of bitrate streams is transmitted, using the satellite uplink router, to the satellite 130 for distribution to one or more downlink servers 134 for concurrent distribution of the first plurality of bitrate streams and the second plurality of bitrate streams on the Internet. Typically, in such embodiments, the first plurality of bitrate streams are configured for a first adaptive bitrate streaming protocol and the second plurality of bitrate streams are configured for a second adaptive bitrate streaming protocol. In such instances the following takes place concurrently: (i) the first plurality of bitrate streams of the live event are downloaded and served to a first plurality of client devices using the first adaptive bitrate streaming protocol and (ii) the second plurality of bitrate streams of the live event are downloaded and served to a second plurality of client devices using the second adaptive bitrate streaming protocol. In some embodiments, a client device in the first plurality of client devices is an APPLE iPAD or APPLE iPHONE, a client device in the second plurality of client devices implements Internet Explorer 9.0 or greater, the first adaptive bitrate streaming protocol is APPLE HTTP adaptive streaming, and the second adaptive bitrate streaming protocol is ADOBE dynamic streaming for FLASH. In some embodiments, the method further comprises serving the first plurality of transmitted bitrate streams and the second plurality of transmitted bitrate streams using HTML5. In some embodiments, the first plurality of bitrate streams and the second plurality of bitrate streams are transmitted to the satellite 130 using a TCP or UDP protocol. In some embodiments, the first and second plurality of bitrate streams are each stored in one or more video containers (e.g., MP4, 3GP, or 3G2).

Figure 3:
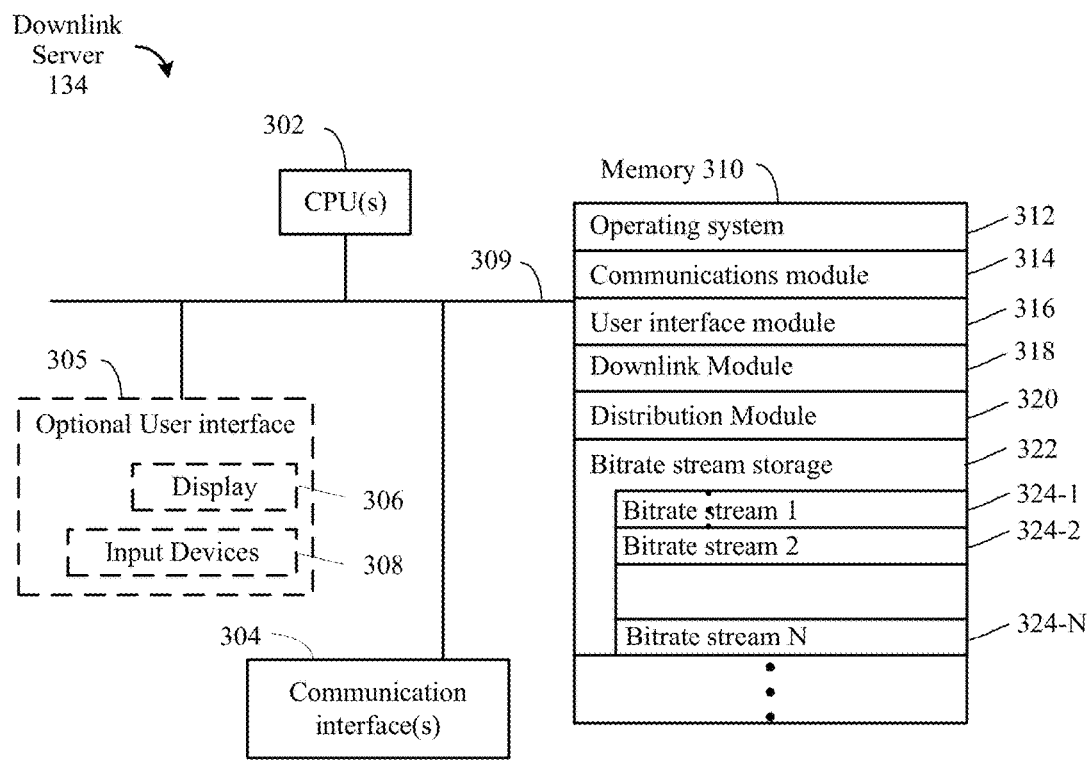
FIG. 3 is a block diagram illustrating downlink server 134, according to some embodiments.

FIG. 3 is a block diagram illustrating downlink server 134, according to some embodiments. The downlink server 134 typically includes one or more processing units (CPU's, sometimes called processors) 302 for executing programs (e.g., programs stored in memory 310), one or more network or other communications interfaces 304, memory 310, and one or more communication buses 309 for interconnecting these components. The communication buses 309 may include circuitry (sometimes called a chipset) that interconnects and controls communications between system components. The downlink server 134 optionally includes a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting the downlink server 134 to other computers via the one or more communication interfaces 304 (wired or wireless) and one or more communication networks, such as the Internet, other wide area networks, local area networks, metropolitan area networks, and so on;
- an optional user interface module 316 that receives commands from the user via the input devices 308 and generates user interface objects in the display device 306;
- a downlink module 318 for downloading from a satellite 132 a plurality of bitrate streams;
- a distribution module 320 for distributing the plurality of bitrate streams to a plurality of devices 138; and
- a bitrate stream storage module 322 for storing a plurality of bitrate streams 324, each respective bitrate stream in the plurality of bitrate streams comprising the video portion of a composite serial digital interface signal encoded at a corresponding bitrate in a first plurality of bitrates by a first video codec.

In some embodiments, the programs or modules identified above correspond to sets of instructions for performing a function described above. The sets of instructions can be executed by one or more processors (e.g., the CPUs 302). The above identified modules or programs (i.e., sets of instructions) need not be implemented as separate software programs, procedures or modules, and thus various subsets of these programs or modules may be combined or otherwise re-arranged in various embodiments. In some embodiments, memory 310 stores a subset of the modules and data structures identified above. Furthermore, memory 310 may store additional modules and data structures not described above.

Although FIG. 3 shows a "server," FIG. 3 is intended more as a functional description of the various features which may be present in a set of servers than as a structural schematic of the embodiments described herein. In practice, and as recognized by those of ordinary skill in the art, items shown separately could be combined and some items could be separated. For example, some items shown in FIG. 3 could be implemented by one or more servers. The actual number of servers used to implement a server and how features are allocated among them will vary from one implementation to another.

Figure 4:
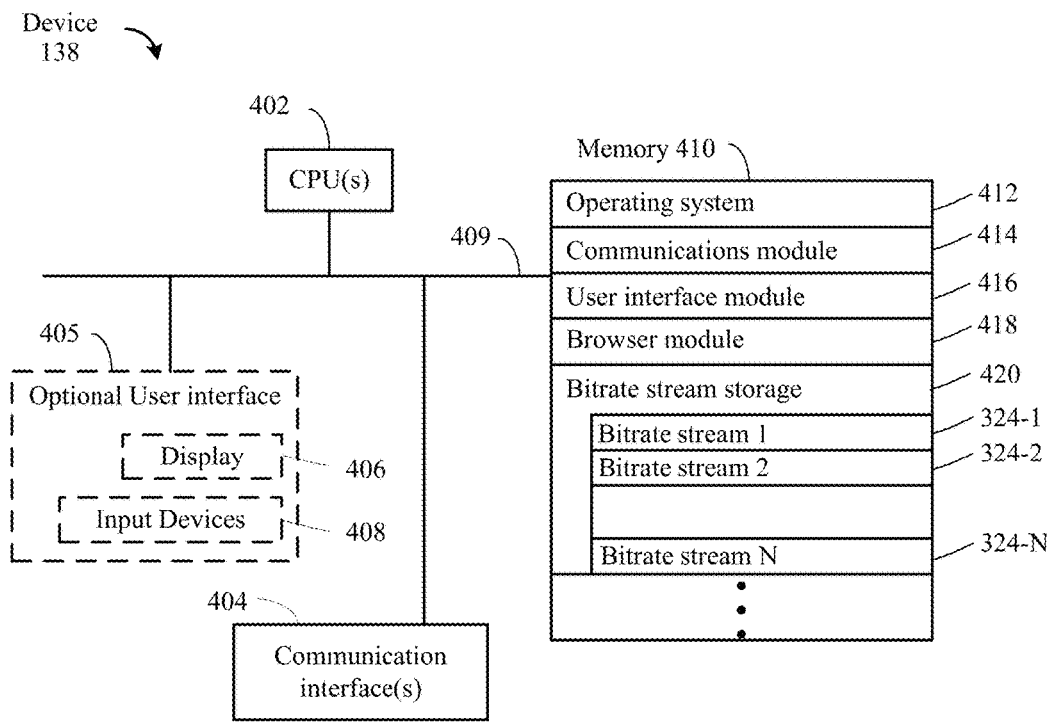
FIG. 4 is a block diagram illustrating a client device 138, according to some embodiments.

FIG. 4 is a block diagram illustrating a client device 138, according to some embodiments. Note that discussion below may apply to any client device. The client device 138-1 typically includes one or more processing units (CPU's, sometimes called processors) 402 for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The client device 138 includes a user interface 405 comprising a display 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:
- an operating system 412 that includes procedures for handling various basic system services and for performing hardware dependent tasks;
- a communication module 414 that is used for connecting the client device 104 to other computers via the one or more communication interfaces 404 (wired or wireless) and one or more communication networks, such as the Internet, other wide area networks, local area networks, metropolitan area networks, and so on;
- a user interface module 416 that receives commands from the user via the input devices 408 and generates user interface objects in the display 406;
- a browser module 418 that provides a user interface for users to access to a bitrate stream in a plurality of bitrate streams in accordance with the methods disclosed in the present disclosure; and
- optional bitrate stream storage 420 for storing one or more bitrate streams 324, each such bitrate stream 324 comprising the video portion of a composite serial digital interface signal encoded at a corresponding bitrate in a first plurality of bitrates by a first video codec.

In some embodiments, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 410 stores a subset of the modules and data structures identified above. Furthermore, memory 410 may store additional modules and data structures not described above.

Although FIG. 4 shows a "client device," FIG. 4 is intended more as functional description of the various features which may be present in a client device than as a structural schematic of the embodiments described herein. In practice, and as recognized by those of ordinary skill in the art, items shown separately could be combined and some items could be separated.

Figure 5:
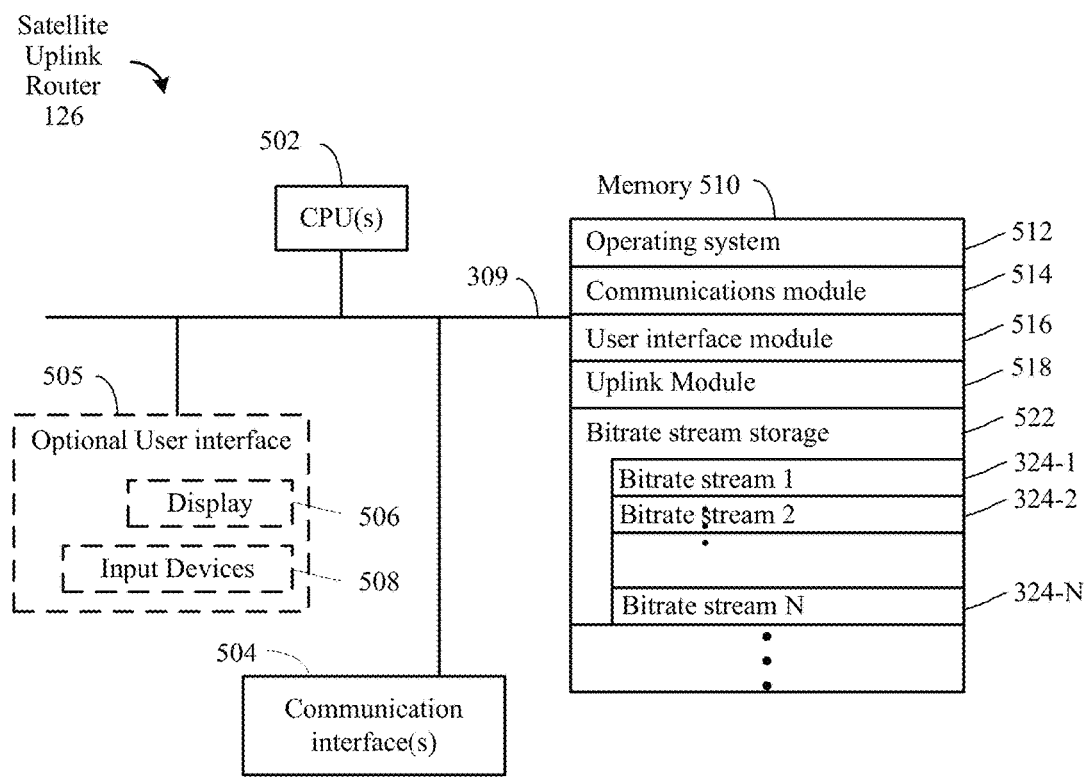
FIG. 5 is a block diagram illustrating a satellite uplink router 126, according to some embodiments.

FIG. 5 is a block diagram illustrating a satellite uplink router 126, according to some embodiments. The satellite uplink router 126 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The satellite uplink router 126 optionally includes a user interface 505 comprising a display 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:
- an operating system 512 that includes procedures for handling various basic system services and for performing hardware dependent tasks;
- a communication module 514 that is used for connecting the satellite uplink router 126 to other computers and/or the encoder 124 via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display 506;
- an uplink module 518 for uploading a plurality of bitrate streams 324 to a satellite; and
- optional bitrate stream storage 522 for storing one or more bitrate streams 324, each such bitrate stream 324 comprising the video portion of a composite serial digital interface signal encoded at a corresponding bitrate in a first plurality of bitrates by a first video codec.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a satellite uplink router 126, FIG. 5 is intended more as functional description of the various features which may be present in a client device than as a structural schematic of the embodiments described herein. In practice, and as recognized by those of ordinary skill in the art, items shown separately could be combined and some items could be separated.

The methods illustrated in FIG. 2 may be governed by instructions that are stored in a computer readable storage medium and that are executed by at least one processor of at least one server. Each of the operations shown in FIG. 2 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A portable system for distributing an audio/visual feed of an event, comprising:
    a first microphone positioned at a first position relative to the event;
    a second microphone positioned at a second position relative to the event;
    a sound mixer, wherein the sound mixer receives and mixes at least (i) a first ambient audio signal from the first ambient microphone, (ii) a second ambient audio signal from the second ambient microphone, and (iii) a sound board feed from a public address system associated with the event, thereby forming a mixed audio signal;
    one or more video cameras positioned to record the event;
    a video board comprising one or more video inputs, each respective video input in the one or more video inputs receiving a video input signal from a corresponding video camera in the one or more video cameras, the video board further comprising a selection mechanism for selecting the video input signal received by a video input in the one or more video inputs as a video output from the video board;

a recorder, wherein the recorder comprises (i) an audio input for receiving the mixed audio signal from the sound mixer and (ii) a video input for receiving the video output from the video board, and wherein the recorder combines the mixed audio signal with the video output from the video board, thereby producing an audio/visual signal and wherein the recorder outputs the audio/visual signal as a composite serial digital interface signal;

an encoder having an input port for receiving the composite serial digital interface signal, the encoder encoding the composite serial digital interface signal using (i) a first video codec at each of a first plurality of bitrates and (ii) a first audio codec, thereby forming a first plurality of bitrate streams, each respective bitrate stream in the first plurality of bitrate streams comprising the video portion of the composite serial digital interface signal encoded at a corresponding bitrate in the first plurality of bitrates by the first video codec; and a satellite uplink router that:
receives the first plurality of bitrate streams using an HTTP protocol, and
transmits the first plurality of bitrate streams to a satellite for distribution to one or more downlink servers for distribution on the Internet.

2. The portable system of claim 1, further comprising:
a first pre-amplifier for amplifying the first ambient audio signal from the first ambient microphone before the first ambient audio signal is received by the sound mixer; and
a second pre-amplifier for amplifying the second ambient audio signal from the second ambient microphone before the second ambient audio signal is received by the sound mixer.

3. The portable system of claim 2, further comprising an amplifier that:
amplifies the first ambient audio signal from the first pre-amplifier before the first ambient audio signal is received by the sound mixer, and
amplifies the second ambient audio signal from the second pre-amplifier before the second ambient audio signal is received by the sound mixer.

4. The portable system of claim 3, wherein the amplifier:
compresses the first ambient audio signal from the first pre-amplifier in accordance with one or more compression parameters before the first ambient audio signal is received by the sound mixer, and
compresses the second ambient audio signal from the second pre-amplifier in accordance with one or more compression parameters before the second ambient audio signal is received by the sound mixer.

5. The portable system of claim 4, wherein the one or more compression parameters is a plurality of parameters comprising a threshold, a compression ratio, an attack time, and a release time.

6. The portable system of claim 1, wherein the selection mechanism wipes or transitions between (i) a first video input signal that was previously selected as the video output from the video board and (ii) a second video input signal that is currently selected as the video output from the video board.

7. The portable system of claim 1, wherein
the first plurality of bitrate streams invoke adaptive bitrate streaming, and
the portable system further comprises a downlink server that downloads the first plurality of bitrate streams of the event and serves the first plurality of bitrate streams to a first plurality of client devices using a first adaptive bitrate streaming protocol.

8. The portable system of claim 7, wherein the first adaptive bitrate streaming protocol is dynamic streaming.

9. The portable system of claim 7, wherein the first adaptive bitrate streaming protocol is adaptive streaming.

10. The portable system of claim 7, wherein the downlink server serves the first plurality of bitrate streams using HTML5.

11. The portable system of claim 1, wherein the satellite uplink router transmits the first plurality of bitrate streams to the satellite using a TCP or UDP protocol.

12. The portable system of claim 1, wherein
the encoder further encodes the composite serial digital interface signal using (i) a second video codec at each of a second plurality of bitrates and (ii) a second audio codec, thereby forming a second plurality of bitrate streams, each respective bitrate stream in the second plurality of bitrate streams comprising the video portion of the composite serial digital interface signal encoded at a corresponding bitrate in the second plurality of bitrates by the second video code; and
the satellite uplink router:
receives the second plurality of bitrate streams using an HTTP protocol concurrently to receiving the first plurality of bitrate streams, and
transmits the second plurality of bitrate streams to the satellite for distribution to one or more downlink servers for concurrent distribution of the first plurality of bitrate streams and the second plurality of bitrate streams on the Internet.

13. The portable system of claim 12, wherein
the first plurality of bitrate streams invoke a first adaptive bitrate streaming protocol, and
the second plurality of bitrate streams invoke a second adaptive bitrate streaming protocol, and
the portable system further comprises a downlink server that concurrently (i) downloads the first plurality of bitrate streams of the event and serves the first plurality of bitrate streams to a first plurality of client devices using the first adaptive bitrate streaming protocol and (ii) downloads the second plurality of bitrate streams of the event and serves the second plurality of bitrate streams to a second plurality of client devices using the second adaptive bitrate streaming protocol.

14. The portable system of claim 12, wherein the downlink server further serves the first plurality of bitrate streams and the second plurality of bitrate streams using HTML5.

15. The portable system of claim 12, wherein the satellite uplink router transmits the first plurality of bitrate streams and the second plurality of bitrate streams to the satellite using a TCP or UDP protocol.

16. The portable system of claim 12, wherein the first and second audio codec is the same.

17. A method for distributing an audio/visual feed of an event, the method comprising:
mixing together at least (i) a first ambient audio signal from a first ambient microphone monitoring the event, (ii) a second ambient audio signal from a second ambient microphone monitoring the event, and (iii) a sound board feed from a public address system associated with the event, thereby forming a mixed audio signal;

receiving a respective video input signal at each respective video input in one or more video inputs at a video board from a corresponding camera in the one or more video cameras, wherein the one or more video cameras are positioned to record the event;

selecting a video input signal received by a video input in the one or more video inputs as a video output from the video board;

receiving the mixed audio signal at an audio input of a recorder;

receiving the video output from the video board at a video input of the recorder;

combining, at the recorder, the mixed audio signal with the video output thereby producing an audio/visual signal formatted as a composite serial digital interface signal;

receiving the composite serial digital interface signal at an encoder;

encoding, at the encoder, the composite serial digital interface signal using (i) a first video codec at each of a plurality of bitrates and (ii) a first audio codec, thereby forming a first plurality of bitrate streams, each respective bitrate stream in the first plurality of bitrate streams comprising the video portion of the composite serial digital interface signal encoded at a corresponding bitrate in the first plurality of bitrates by the first video codec;

receiving the first plurality of bitrate streams at a satellite uplink router using an HTTP protocol; and transmitting, using the satellite uplink router, the first plurality of bitrate streams to a satellite for distribution to one or more downlink servers for distribution on the Internet.

18. The method of claim 17, the method further comprising:
compressing the first ambient audio signal from the first pre-amplifier in accordance with one or more compression parameters prior to the mixing, and
compressing the second ambient audio signal from the second pre-amplifier in accordance with one or more compression parameters prior to the mixing.

19. The method of claim 18, wherein the one or more compression parameters is a plurality of parameters comprising a threshold, a compression ratio, an attack time, and a release time.

20. The method of claim 17, wherein the first plurality of bitrate streams invoke adaptive bitrate streaming, and the method further comprises:
downloading the first plurality of bitrate streams of the event with a downlink server that serves the first plurality of bitrate streams to a first plurality of client devices using a first adaptive bitrate streaming protocol.

21. The method of claim 17 wherein
the encoding further encodes the composite serial digital interface signal using (i) a second video codec at each of a second plurality of bitrates and (ii) a second audio codec, thereby forming a second plurality of bitrate streams, each respective bitrate stream in the second plurality of bitrate streams comprising the video portion of the composite serial digital interface signal encoded at a corresponding bitrate in the second plurality of bitrates by the second video code,
the second plurality of bitrate streams is received at the satellite uplink router using an HTTP protocol concurrent to when the first plurality of bitrate streams is received, and
the second plurality of bitrate streams is transmitted, using the satellite uplink router, to the satellite for distribution to one or more downlink servers for concurrent distribution of the first plurality of bitrate streams and the second plurality of bitrate streams on the Internet.

22. The method of claim 21, wherein the first plurality of bitrate streams invoke a first adaptive bitrate streaming protocol and the second plurality of bitrate streams invoke a second adaptive bitrate streaming protocol, the method further comprising:
concurrently (i) downloading the first plurality of bitrate streams of the event and serving the first plurality of bitrate streams to a first plurality of client devices using the first adaptive bitrate streaming protocol and (ii) downloading the second plurality of bitrate streams of the event and serving the second plurality of bitrate streams to a second plurality of client devices using the second adaptive bitrate streaming protocol.

23. The portable system of claim 1, wherein the one or more video cameras is a plurality of video cameras.

24. The method of claim 17, wherein the one or more video cameras is a plurality of video cameras.

* * * * *